（12） United States Patent
Doi (10) Patent No.: US 10,311,174 B2
(45) Date of Patent: Jun. 4, 2019

(54) INNERMOST DATA SHARING METHOD OF LATTICE QUANTUM CHROMODYNAMICS CALCULATION

(71) Applicant: INTERNATIONAL BUSINESS MACHINES CORPORATION, Armonk, NY (US)

(72) Inventor: Jun Doi, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 874 days.

(21) Appl. No.: 14/920,529

(22) Filed: Oct. 22, 2015

(65) Prior Publication Data

US 2017/0116356 A1    Apr. 27, 2017

(51) Int. Cl.
*G06F 17/10* (2006.01)
*G06F 17/50* (2006.01)

(52) U.S. Cl.
CPC .......... *G06F 17/5009* (2013.01); *G06F 17/10* (2013.01); *G06F 2217/16* (2013.01)

(58) Field of Classification Search
CPC ... G06F 17/5009; G06F 17/10; G06F 2217/16
USPC ............................................................ 703/2
See application file for complete search history.

(56) References Cited

PUBLICATIONS

Clark et al. "Solving lattice QCD systems of equations using mixed precision solvers on GPUs"., Computer Physics Communications vol. 181, Issue 9, Sep. 2010, pp. 1517-1528.*
Doi "Performance evaluation and tuning of lattice QCD on the next generation Blue Gene". Proceedings of Science., Aug. 4, 2007, 7 Pages.*
Shi et al. "Accelerating Quantum Chromodynamics Calculations with GPUs". University of Illinois, 2014., 3 Pages.*

* cited by examiner

*Primary Examiner* — Eunhee Kim
(74) *Attorney, Agent, or Firm* — Tutunjian & Bitetto, P.C.; Vazken Alexanian (57) ABSTRACT

A method for calculating lattice quantum chromodynamics (QCD) that includes loading an aligned spinor and gauge matrix, and constructing a half-spinor for plus and minus from the aligned spinors. In a following step, the method may include calculating a half spinor minus to be transferred to a positive neighbor of the gauge matrix by multiplying the gauge matrix and half-spinor for minus. The half-spinor for plus (Hp) and the half spinor minus may be stored in a shared memory. In a following step, the method may continue with calculating a half spinor plus to be transferred to a negative neighbor of the gauge matrix by multiplying the gauge matrix and the half-spinor for plus. Thereafter, the sum of half-spinors may be calculated.

20 Claims, 6 Drawing Sheets

FIG. 4B c is one of {1,-1,io,-i}

INNERMOST DATA SHARING METHOD OF LATTICE QUANTUM CHROMODYNAMICS CALCULATION

BACKGROUND

Technical Field

The present disclosure relates to lattice quantum chromodynamics.

Description of the Related Art

Lattice QCD is a well-established non-perturbative approach to solving the quantum chromodynamics (QCD) theory of quarks and gluons. A quark-gluon plasma (QGP) or quark soup is a state of matter in quantum chromodynamics (QCD) which is hypothesized to exist at extremely high temperature, density, or both temperature and density.

Lattice QCD is a lattice gauge theory formulated on a grid or lattice of points in space and time. When the size of the lattice is taken infinitely large and its sites infinitesimally close to each other, the continuum QCD is recovered. Analytic or perturbative solutions in low-energy QCD are hard or impossible due to the highly nonlinear nature of the strong force and the large coupling constant at low energies. This formulation of QCD in discrete rather than continuous space time naturally introduces a momentum cut-off at the order 1/a, where a is the lattice spacing, which regularizes the theory. As a result, lattice QCD is mathematically well-defined.

Lattice QCD provides a framework for investigation of non-perturbative phenomena such as confinement and quark-gluon plasma formation, which are intractable by means of analytic field theories. In lattice QCD, fields representing quarks are defined at lattice sites (which leads to fermion doubling), while the gluon fields are defined on the links connecting neighboring sites. This approximation approaches continuum QCD as the spacing between lattice sites is reduced to zero. Because the computational cost of numerical simulations can increase dramatically as the lattice spacing decreases, results are often extrapolated to a=0 by repeated calculations at different lattice spacings that are large enough to be tractable.

Numerical lattice QCD calculations using Monte Carlo methods can be extremely computationally intensive, requiring the use of the largest available supercomputers. Lattice QCD has been used as a benchmark for high-performance computing.

SUMMARY

In one embodiment, the present disclosure provides a method for calculating lattice quantum chromodynamics (QCD) that includes loading an aligned spinor (W)'s and gauge matrix (U)'s into a hardware processor and constructing half-spinor for plus (Hp)'s and minus (Hn)'s from (W)'s. In a following step, the method may include calculating a half spinor minus (Hn') to be transferred to a positive neighbor of the gauge matrix by multiplying the gauge matrix (U) and half-spinor for minus (Hn) before storing in a shared memory. The method may continue with storing the half spinor for plus (Hp) in a fast storage to exchange between threads of shared memory in the streaming processor unit of GPU. In a following step, the method may continue with loading the half spinor minus (Hn')'s from a shared memory and calculating a half spinor plus (Hp') to be transferred to a negative neighbor of the gauge matrix by multiplying the gauge matrix (U) and the half-spinor for plus (Hp). Thereafter, the sum of half-spinors may be calculated from the half spinor minus (Hn') to be transferred to the positive neighbor of the gauge matrix and the half spinor plus (Hp') to be transferred to the negative neighbor of the gauge matrix.

In another embodiment, the present disclosure provides a non-transitory computer readable storage medium that includes a computer readable program for calculating lattice quantum chromodynamics (QCD), wherein the non-transitory computer readable program when executed on a computer causes the computer to perform steps that include loading an aligned spinor (W)'s and gauge matrix (U)'s and constructing half-spinor for plus (Hp)'s and minus (Hn)'s from (W)'s. In a following step, the method may include calculating (Hn')=(U)*(Hn). Storing (Hp) in a shared memory. In a following step, the method may continue with loading (Hn')'s from a shared memory and calculating (Hp')=(U)*(Hp). Thereafter, the sum of half-spinors may be calculated from the half spinor minus (Hn') to be transferred to the positive neighbor of the gauge matrix and the half spinor plus (Hp') to be transferred to the negative neighbor of the gauge matrix.

In yet another embodiment, a system is provided for calculating lattice quantum chromodynamics (QCD) that includes a loading module for loading an aligned spinor (W)'s and gauge matrix (U)'s into a hardware processor, and a half-spinor constructor module for constructing a half spinor for plus (Hp)'s and minus (Hn)'s from the aligned spinors (W)'s. The system may further include a calculation module for calculating a half spinor minus (Hn') to be transferred to a positive neighbor of the gauge matrix by multiplying the gauge matrix (U) and half-spinor for minus (Hn) before storing in a shared memory. The system can also include a storage module for storing the half-spinor for plus (Hp) and minus (Hn') in the shared memory. A calculating module may be employed for calculating a half spinor plus (Hp') to be transferred to a negative neighbor of the gauge matrix by multiplying the gauge matrix (U) and the half-spinor for plus (Hp). The system for calculating QCD may also include a calculating module for calculating the sum of half-spinors from the half spinor minus (Hn') to be transferred to the positive neighbor of the gauge matrix and the half spinor plus (Hp') to be transferred to the negative neighbor of the gauge matrix.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

The methods of lattice QCD calculations disclosed herein are suitable for computing applications. Lattice Quantum Chromodynamics (QCD) is one of the most challenging applications running on massively parallel supercomputers. Embodiments of the present invention provide an innermost data sharing method of lattice QCD calculation. Some embodiments of the present disclosure are now described with reference to FIGS. 1-8.

Figure 1:
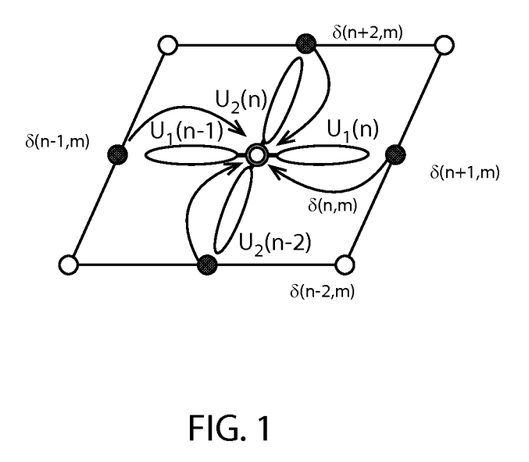
FIG. 1 is a diagram of a lattice suitable for use with a lattice Quantum Chromodynamics (QCD) calculation, in accordance with one embodiment of the present disclosure.

In some embodiments of the data sharing method of the present disclosure, the method employs a kernel code of lattice QCD. In some embodiments, the innermost loop of the QCD has a kernel that consumes a majority of the machine's cycles, e.g., supercomputer. The kernel disclosed herein uses a means for placing quarks on the lattice. In lattice QCD, fields representing quarks are defined at lattice sites (which leads to fermion doubling), while the gluon fields are defined on the links connecting neighboring sites, as depicted in FIG. 1. In FIG. 1, the quark field is identified by $\delta$, e.g., 2 quarks defined in neighboring lattice sites in the first dimension $\delta(n-1, m)$ and $\delta(n+1, m)$, and other 2 quarks in the second dimension $\delta(n+2, m)$ and $\delta(n-2, m)$, and the gluon field is identified by U, e.g., $U_1(n)$, $U_1(n-1)$, $U_2(n)$, and $U_2(n-1)$.

In accordance with the present disclosure, the Wilson-Dirac operator, i.e., equation (1), can describe the kinematics of quarks and their interaction with the gluon field. As will be discussed in greater detail below, the method may employ a Wilson-Dirac operator D(n) as follows:

$$D(n)=\delta(n)-k\cdot\Sigma_{\mu=1}^{4}\{(1-\gamma_{\mu})U_{\mu}(n)\delta(n+\hat{\mu})+(1+\gamma_{\mu})U_{\mu}^{\dagger}(n-\hat{\mu})\delta(n-\hat{\mu})\} \quad \text{Equation (1):}$$

wherein n is equal to a lattice site, k is equal to kappa constant, $\delta$ is equal to quark spinor, U is equal to gauge matrix, $U^{\dagger}$ is a matrix orthogonal to U, $\gamma_{\mu}$ is projector gamma matrix and $\mu$ is one of the 4 dimensions.

In accordance with some embodiments of the present disclosure, 1,488 flops per lattice site with 2,880 byte data access can results in approximately 2.06 byte/flops (double precision). In some examples, with memory bound problems, performance optimization can be achieved by decreasing memory access or increasing the efficiency of the memory access.

Figure 2:
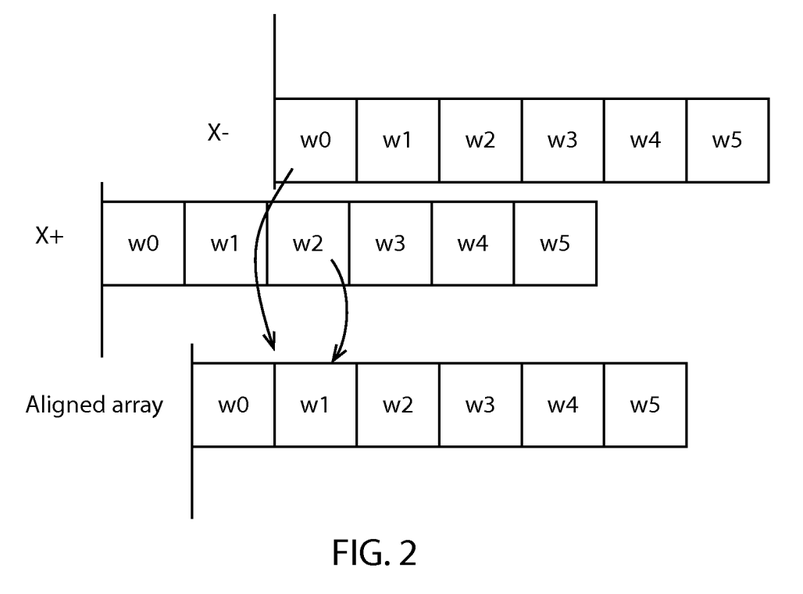
FIG. 2 is a diagram of an alignment and non-alignment of arrays, as used in the innermost data sharing method of lattice QCD.

In some embodiments, the data alignment of the array is key to efficient data access in SIMD processors, e.g., coalesced access of compute unified device architecture (CUDA) graphics processor units (GPU's). FIG. 2 is a diagram depicting alignment and non-alignment of arrays. It is noted that the uppermost array is offset by X– and the middle array is offset by X+, wherein X is an increment of the lattice. Single instruction, multiple data (SIMD), is a class of parallel computers, which includes computers with multiple processing elements that perform the same operation on multiple data points simultaneously. Thus, SIMD machines exploit data level parallelism, but not concurrency: there are simultaneous (parallel) computations, but only a single process (instruction) at a given moment.

The innermost calculation breaks data alignment, because accessing neighboring lattice sites on the innermost dimension is not typically aligned. This can decrease memory access efficiency. In some embodiments, the other dimensions are aligned access.

In some embodiments, the innermost data sharing method of lattice QCD calculation that is provided by the present disclosure includes loading only one element to the register from the aligned array, and referring neighbors via faster storage. In some embodiments, the methods of the present disclosure employ a Wilson-Dirac operator, 4×3 spinor and 3×3 gauge matrix (both complex numbers) are loaded for both plus/minus directions, sharing them with neighbors can decreases 336 bytes data load (double precision) from slower storage. Spinors are elements of a (complex) vector space. The spinors may each have a plus or minus direction. In some embodiments, the 4×3 spinor can be compressed to a 2×3 half spinor using SU(3) symmetry. The 3×3 gauge matrix is not transferred but multiplied before and/or after transferring the half spinor.

Figure 3:
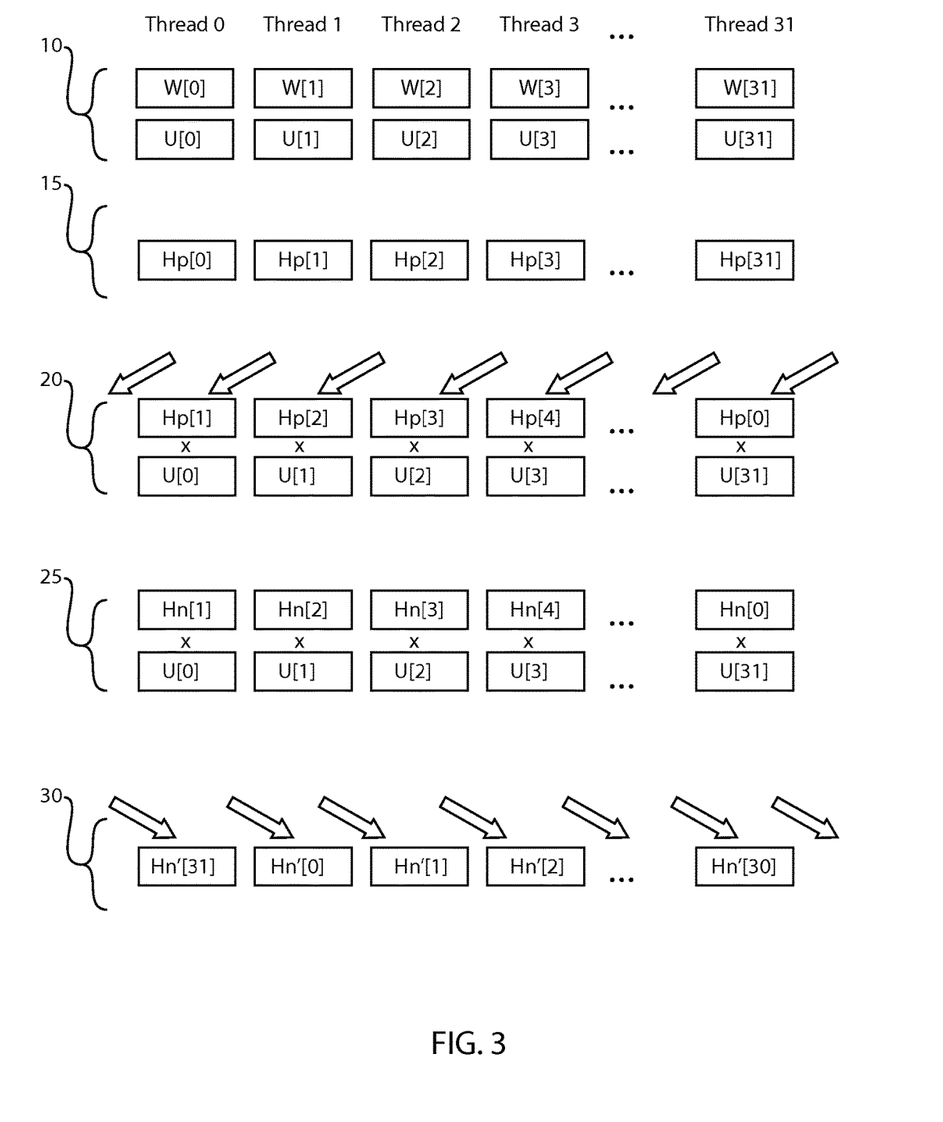
FIG. 3 is a block/flow diagram of one embodiment of an innermost data sharing method of lattice QCD, in accordance with the present principles.
Figure 4A:
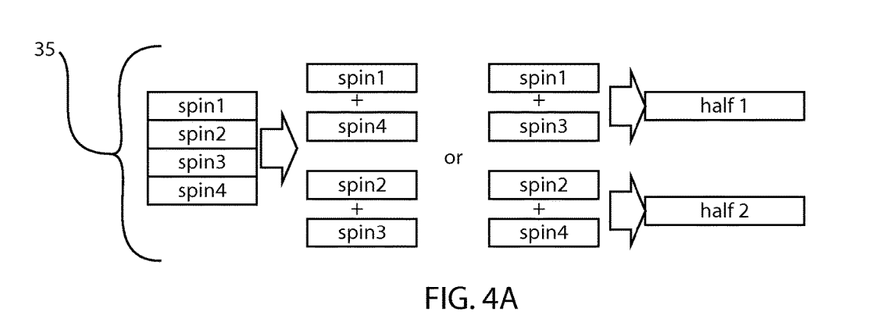
FIG. 4A is a block diagram illustrating half-spinor calculation as part of the Wilson-Dirac operator and half-spinor construction, in accordance with one embodiment of the present disclosure.
Figure 4B:
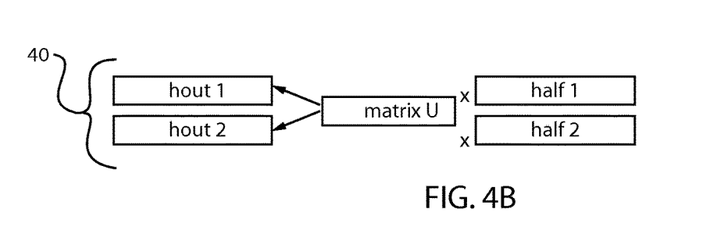
FIG. 4B is a block diagram illustrating multiplying the gauge matrix and half spinor as part of the Wilson-Dirac operator and half-spinor construction, in accordance with one embodiment of the present disclosure.
Figure 4C:
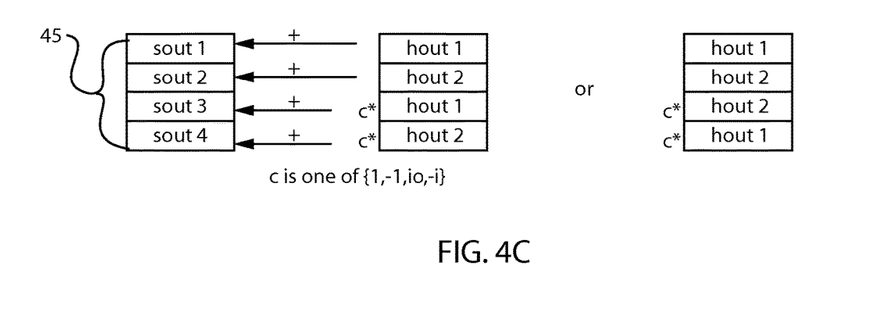
FIG. 4C is a block diagram illustrating a calculation of the sum of half-spinors as part of the Wilson-Dirac operator and half-spinor construction, in accordance with one embodiment of the present disclosure.

Referring to FIG. 3, in some embodiments, in the innermost data sharing method of the lattice QCD calculation may include loading the aligned spinor (W) and gauge matrix (U) for each of the sites, e.g., thread 0, thread 1, thread, 2, thread 3, thread 31, at step 10. Thereafter, the method continues with constructing half-spinor for positive direction (+/plus) (Hp), at step 15. In some embodiments, this step may also include constructing the half spinor for negative direction (–/minus), as depicted in FIG. 4A. At step 20, the innermost data sharing method of the lattice QCD calculation may further include copying the half-spinor for the positive direction to minus neighbors. The copied half-spinor Hp is multiplied by gauge field U to provides Hp' as depicted in FIG. 4B. In FIG. 4B, Hp is shown in half1 and half2 (3×2 elements) and multiplied by matrix U, wherein the output half-spinor is Hp' shown in hout1 and hout2. In some embodiments in which the half spinor for negative direction (–/minus) (Hn) has not been constructed at this stage of the process flow, the half spinor for negative direction (–/minus) (Hn) may be constructed at step 25. In some embodiments, the method may include calculating multiplication of half-spinor Hn and gauge matrix U that provides output half-spinor Hn', as depicted in FIG. 4B. At step 30, there may be a half-spinor exchange (Hn') (to positive neighbors) via faster storage. In some embodiments, the method may include calculating Hp'=U*Hp. Thereafter, a calculation of the sum of half spinors (as depicted in FIG. 4C) can be completed using a Wilson-Dirac operator for innermost data sharing (X) by equation 2 as follows:

$$D(n)=\delta(n)-k\cdot(1-\gamma_1)U_1(n)\delta(n+1)U_l^{\dagger}(n-1)\delta(n-1) \quad (2):$$

wherein D is an innermost Wilson-Dirac operator, n is equal to lattice site, k is equal to the constant kappa, $\delta$ is equal to quark spinor, and U is equal to the gauge matrix, $U^{\dagger}$ is a matrix orthogonal to U in one of 4 dimensions l.

In some embodiments, the above described methods can provide for faster storage in computer memory applications, such as CACHE memory, shared memory, e.g., CUDA GPUs, and to register to register data copy operation, e.g., warp shuffle operation in CUDA GPUs.

FIGS. 4A-4C depicts one embodiment of a Wilson-Dirac operator and half-spinor calculation, which may include three steps of calculations. The first step may include the half-spinor construction as depicted in FIG. 4A. In some embodiments, the half-spinor construction depicted in FIG. 4A may provide step 15 of the process flow described in FIG. 3. Referring to FIG. 4B, in a second step of the Wilson-Dirac operator and half-spinor calculation continues with multiplying the gauge matrix and half spinor. As depicted in FIG. 4B, multiplying matrix U with half 1 and half 2 provided by the half-spinor construction as depicted in FIG. 4A provides hout 1 and hout 2. FIG. 4C illustrates one embodiment of a calculation of the sum of half-spinors as part of the Wilson-Dirac operator and half-spinor construction. Calculation of the sum of half-spinors may be consistent with equation (2).

Figure 5:
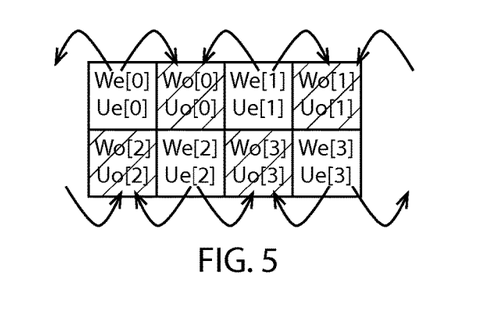
FIG. 5 is a block diagram depicting an even-odd gauge matrix, in accordance with one embodiment of the present disclosure.
Figure 6:
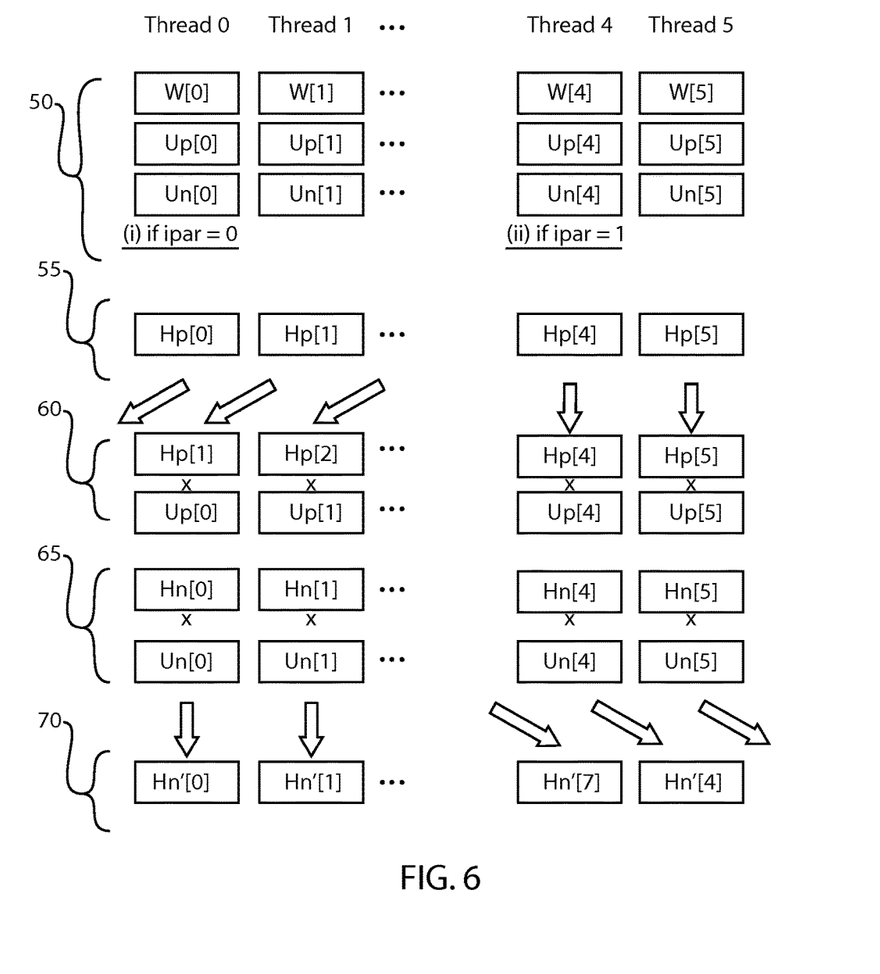
FIG. 6 is a block diagram for a lattice QCD calculation taking into account variation for even-odd preconditioning.

In some embodiments, the methods of the present disclosure are suitable for use with even-odd preconditioning, as depicted in FIGS. 5 and 6. This can provide for storing even and odd sites in separate arrays. The Wilson-Dirac operator may function in two manners, e.g., even-odd and odd-even. In some embodiments, a conditional branch may be needed to determine to which neighbor the half spinor is sent. In even odd, the gauge matrix is not re-used. FIG. 5 depicts 4×2 lattice in even and odd sites with quark spinors W and gauge matrices U, We and Ue are stored for even sites and Wo and Uo are for odd sites in separate arrays.

FIG. 6 is a block diagram for a lattice QCD calculation taking into account even-odd preconditioning and variation. In some embodiments, the method may begin at step 50 with loading spinors W and gauge matrices Up, Un for each lattice site. The method may load aligned spinor (W) and gauge matrices for plus (Up) and minus (Un) directions. In some embodiments, in a following step, a half spinor is constructed for plus (Hp) and minus (Hn), at step 55. For minus direction, half-spinor to be copied to neighbor Hn' may then be calculated by multiplying gauge matrix Un to half-spinor Hn as Hn'=Un*Hn at step 65. In some embodiments, the method may continue with calculating parity, ipar=mod(y+z+t+ieo,2), in which y, z, t are global coordinates of lattice site and ieo defines one of even-to-odd (0) or odd-to-even (1). In some embodiments, when ipar is equal to 0, the half spinor plus (Hp) is copied to minus neighbors at step 60. At step 65, in some embodiments, when ipar is not equal to 0, the half spinor minus (Hn') is copied to plus neighbors. The method may continue with calculating Hp'=U*Hp. Thereafter, a calculation of the sum of half spinors can be completed using a Wilson-Dirac operator for innermost data sharing (X) by equation 2.

In some embodiments, the innermost data sharing method of lattice QCD calculation that is provided by the present disclosure provides for sharing 2×3 half-spinor via faster storage to keep alignment of array access in SIMD processors. In some embodiments, the methods may employ the symmetry of SU(3) in lattice QCD. By reusing the same spinor and gauge matrix for both plus/minus directions to decrease memory access itself. This technique is applicable to variation.

Figure 7:
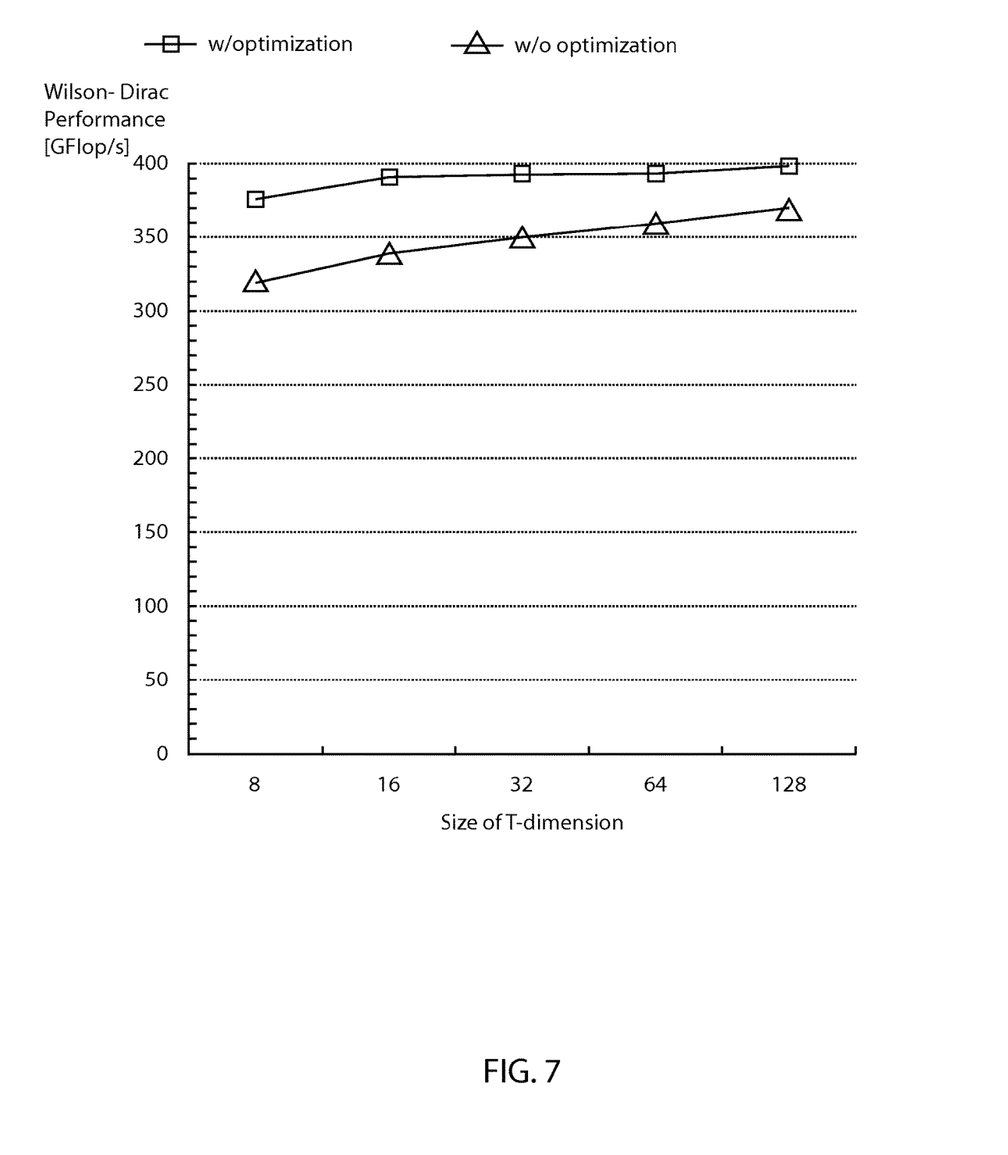
FIG. 7 is a plot illustrating the increase of speed of the lattice QCD calculation in comparison to conventional methods.

In some embodiments, the methods disclosed herein provide a 7% to 15% increase in speed from conventional misaligned, as depicted in FIG. 7. The data was produced from Nvidia Tesla K20X with $24^3 \times T$ lattice. The optimized plot was produced by methods consistent with the present disclosure.

Figure 8:
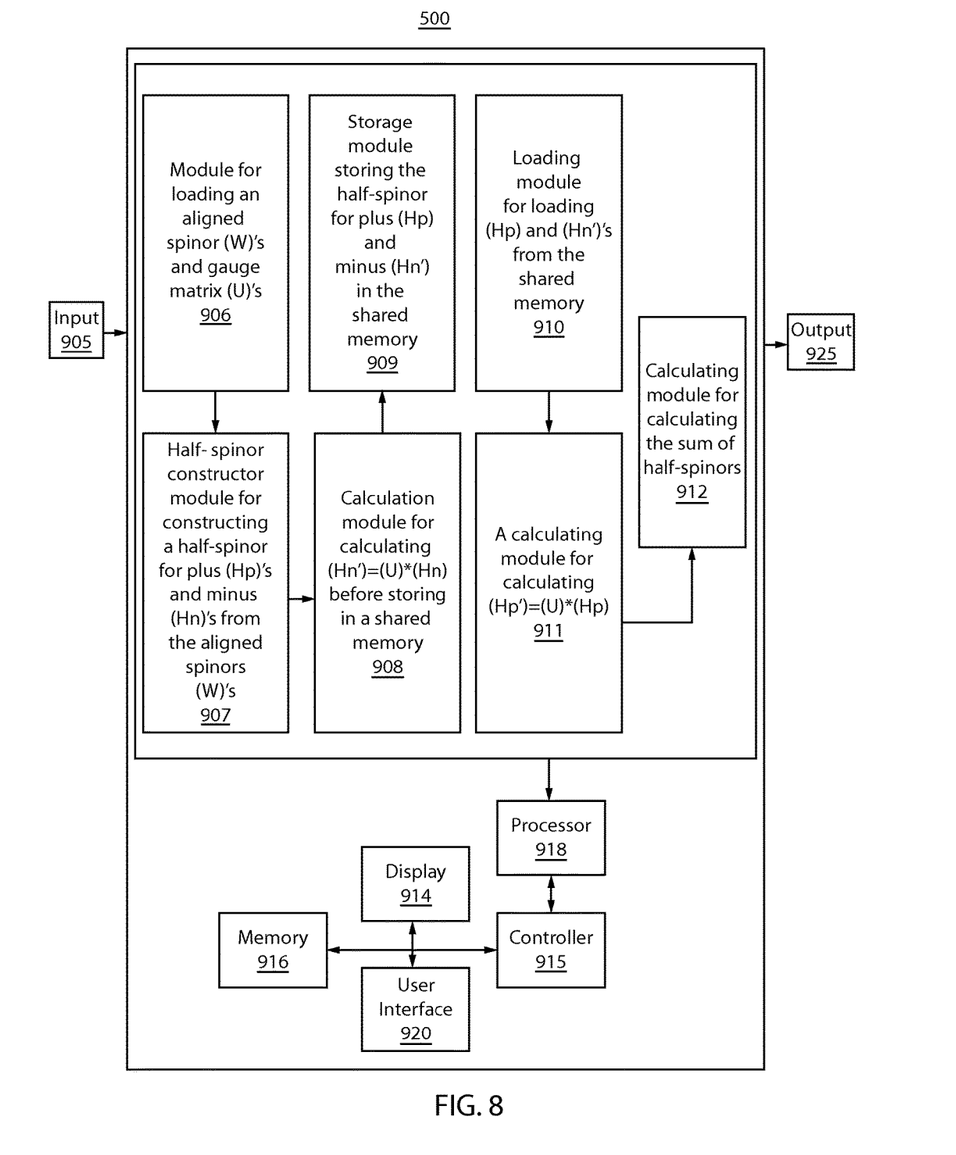
FIG. 8 is a block diagram of a system for lattice QCD calculation, in accordance with one embodiment of the present disclosure.

Referring to FIG. 8, a lattice QCD calculation system 500 is provided that includes a loading module 906 for loading an aligned spinor (W)'s and gauge matrix (U)'s into a hardware processor; a half-spinor constructor module 907 for constructing a half spinor for plus (Hp)'s and minus (Hn)'s from the aligned spinors (W)'s; a calculation module 908 for calculating (Hn')=(U)*(Hn) before storing in a shared memory; a storage module 909 for storing the half-spinor for plus (Hp) and minus (Hn') in the shared memory; a loading module 910 for loading (Hp) and (Hn')'s from the shared memory; a calculating module 911 for calculating (Hp')=(U)*(Hp); and a calculating module 912 for calculating the sum of half-spinors.

In one embodiment, the system 500 preferably includes one or more processors 918, e.g., hardware processor, and memory 916 for storing applications, modules and other data. In one example, the one or more processors 918 and memory 916 may be components of a computer, in which the memory may be random access memory (RAM), a program memory (preferably a writable read-only memory (ROM) such as a flash ROM) or a combination thereof. The computer may also include an input/output (I/O) controller coupled by a CPU bus. The computer may optionally include a hard drive controller, which is coupled to a hard disk and CPU bus. Hard disk may be used for storing application programs, such as some embodiments of the present disclosure, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link.

The system 500 may include one or more displays 914 for viewing the functionality of the modules 10, 15, 20 of the system 500. The displays 914 may permit a user to interact with the system 500 and its components and functions. This may be further facilitated by a user interface 920, which may include a mouse, joystick, or any other peripheral or control to permit user interaction with the system 900 and/or its devices, and may be further facilitated by a controller 915. It should be understood that the components and functions of the system 900 may be integrated into one or more systems or workstations. The display 914, a keyboard and a pointing device (mouse) may also be connected to I/O bus of the computer. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

The system 500 may receive input data 905 which may be employed as input of the communication to be analyzed for sensitivity, formatted, and transmitted by the plurality of modules 906, 907, 908, 909, 910, 911, 912 that provide the lattice QCD calculation system of the present disclosure. The system 500 may produce output data 925, which in the formatted communication to be transmitted, e.g., parsed or non-parsed communication, to the display 300 of an intended recipient of the communication. It should be noted that while the above configuration is illustratively depicted, it is contemplated that other sorts of configurations may also be employed according to the present principles. Further details regarding the functionality of the loading module 906 for loading an aligned spinor (W)'s and gauge matrix (U)'s into a hardware processor; the half-spinor constructor module 907 for constructing a half spinor for plus (Hp)'s and minus (Hn)'s from the aligned spinors (W)'s; the calculation module 908 for calculating (Hn')=(U)*(Hn) before storing in a shared memory; the storage module 909 for storing the half-spinor for plus (Hp) and minus (Hn') in the shared memory; the loading module 910 for loading (Hp) and (Hn')'s from the shared memory; a calculating module 911 for calculating (Hp')=(U)*(Hp); and the calculating module 912 for calculating the sum of half-spinors have been provided above with reference to FIGS. 1-7.

Parts of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of deep neural network training with native devices (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for increasing processing efficiency when calculating lattice quantum chromodynamics (QCD) comprising:
    loading an aligned spinor (W) array and gauge matrix (U) into a hardware processor;
    constructing a half-spinor for plus (Hp) and half-spinor for minus (Hn) from the aligned spinor (W) array;
    calculating a half spinor minus (Hn') to be transferred to a positive neighbor of the gauge matrix by multiplying the gauge matrix (U) and half-spinor for minus (Hn) before storing in a shared memory;
    storing the half-spinor for plus (Hp) and the half spinor minus (Hn') in a shared memory;
    calculating a half spinor plus (Hp') to be transferred to a negative neighbor of the matrix by multiplying the gauge matrix (U) and the half-spinor for plus (Hp); and
    calculating the sum of half-spinors from the half spinor minus (Hn') to be transferred to the positive neighbor of the gauge matrix and the half spinor plus (Hp') to be transferred to the negative neighbor of the gauge matrix.

2. The method of claim 1, wherein calculating the sum of half-spinors comprises a Wilson-Dirac operator.

3. The method of claim 1, wherein calculating the sum of half-spinors includes D=W−k(Hp'+Hn'), wherein D is a Wilson-Dirac operator, and k is equal to a constant kappa.

4. The method of claim 1, wherein the calculation of the sum of half spinors is completed using a Wilson-Dirac operator for innermost data sharing (X) as follows:

$$D(n)=\delta(n)-k\cdot(1-\gamma_1)U_1(n)\delta(n+1)U_1^\dagger(n-1)\delta(n-1)$$

wherein D is an innermost Wilson-Dirac operator, n is equal to a lattice site, k is equal to a constant kappa, γ is a projector gamma matrix, δ is equal to a quark spinor, and U is equal to the gauge matrix, $U^\dagger$ is a matrix orthogonal to U in one of 4 dimensions l.

5. The method of claim 1, wherein the method for calculating QCD employs a symmetry for the gauge matrix of special unitary group of rank 3 (SU(3)) geometry.

6. The method of claim 5, wherein the method comprises compressing a 4×3 spinor to a 2×3 half spinor using said SU(3) geometry.

7. The method of claim 1, wherein the method employs a same spinor and gauge matrix for both plus and minus directions.

8. The method of claim 1, wherein the method provides for sharing 2×3 spinors.

9. A non-transitory computer readable storage medium that includes a computer readable program for calculating lattice quantum chromodynamics (QCD), wherein the non-transitory computer readable program when executed on a computer causes the computer to perform the steps of calculating lattice quantum chromodynamics (QCD) that includes:
    loading an aligned spinor (W) array and gauge matrix (U) into a hardware processor;
    constructing a half-spinor for plus (Hp) and half-spinor for minus (Hn) from the aligned spinor (W) array;
    calculating a half spinor minus (Hn') to be transferred to a positive neighbor of the gauge matrix by multiplying the gauge matrix (U) and half-spinor for minus (Hn) before storing in a shared memory;
    storing the half-spinor for plus (Hp) and the half spinor minus (Hn') in a shared memory;
    calculating a half spinor plus (Hp') to be transferred to a negative neighbor of the gauge matrix by multiplying the gauge matrix (U) and the half-spinor for plus (Hp); and
    calculating the sum of half-spinors from the half spinor minus (Hn') to be transferred to the positive neighbor of the gauge matrix and the half spinor plus (Hp') to be transferred to the negative neighbor of the gauge matrix.

10. The non-transitory computer readable storage medium of claim 9, wherein said calculating the sum of half-spinors comprises a Wilson-Dirac operator.

11. The non-transitory computer readable storage medium of claim 9, wherein said calculating the sum of half-spinors includes $D=W_{-k}(Hp'+Hn')$, wherein D is a Wilson-Dirac operator, and k is equal to a constant kappa.

12. The non-transitory computer readable storage medium of claim 9, wherein the calculation of the sum of half spinors is can be completed using a Wilson-Dirac operator for innermost data sharing (X) using:

$$D(n)=\delta(n)-k\cdot(1-\gamma_1)U_1(n)\delta(n+1)U_1^\dagger(n-1)\delta(n-1)$$

wherein D is an innermost Wilson-Dirac operator, n is equal to a lattice site, k is equal to a constant kappa, γ is a projector gamma matrix, δ is equal to a quark spinor, and U is equal to the gauge matrix, $U^\dagger$ is a matrix orthogonal to U in one of 4 dimensions l.

13. The non-transitory computer readable storage medium of claim 9, wherein the method for calculating QCD employs a symmetry for the gauge matrix of special unitary group of rank 3 (SU(3)) geometry.

14. The non-transitory computer readable storage medium of claim 13, wherein the method for calculating QCD further comprises compressing a 4×3 spinor to a 2×3 half spinor using said SU(3) geometry.

15. The non-transitory computer readable storage medium of claim 9, wherein the method employs a same spinor and gauge matrix for both plus and minus directions.

16. The non-transitory computer readable storage medium of claim 9, wherein the method provides for sharing 2×3 spinors.

17. A system for calculating lattice quantum chromodynamics (QCD) comprising:
a loading module for loading an aligned spinor (W) array and gauge matrix (U) into a hardware processor;
a half-spinor constructor module for constructing a half spinor for plus (Hp) and half-spinor for minus (Hn) from the aligned spinors (W) array;
a calculation module for calculating a half spinor minus (Hn') to be transferred to a positive neighbor of the gauge matrix by multiplying the gauge matrix (U) and half-spinor for minus (Hn) before storing in a shared memory;
a storage module storing the half-spinor for plus (Hp) and minus (Hn') in the shared memory;
a calculating module for calculating a half spinor plus (Hp') to be transferred to a negative neighbor of the gauge matrix by multiplying the gauge matrix (U) and the half-spinor for plus (Hp); and
a calculating module for calculating the sum of half-spinors from the half spinor minus (Hn') to be transferred to the positive neighbor of the gauge matrix and the half spinor plus (Hp') to be transferred to the negative neighbor of the gauge matrix.

18. The system of claim 17, wherein calculating the sum of half-spinors comprises a Wilson-Dirac operator.

19. The system of claim 17, wherein calculating the sum of half-spinors includes D=W−k(Hp'+Hn'), wherein D is a Wilson-Dirac operator, and k is equal to a constant kappa.

20. The system of claim 17, wherein the calculation of the sum of half spinors is completed using a Wilson-Dirac operator for innermost data sharing (X) as follows:

$$D(n) = \delta(n) - k \cdot (1 - \gamma_1) U_1(n) \delta(n+1) U_l^\dagger(n-1) \delta(n-1),$$

wherein D is an innermost Wilson-Dirac operator for innermost, n is equal to a lattice site, k is equal to a constant kappa, γ is a projector gamma matrix, δ is equal to a quark spinor, and U is equal to the gauge matrix, $U^\dagger$ is a matrix orthogonal to U in one of 4 dimensions l.

* * * * *